United States Patent
Nandyala et al.

(10) Patent No.: US 10,237,252 B2
(45) Date of Patent: Mar. 19, 2019

(54) AUTOMATIC CREATION AND MANAGEMENT OF CREDENTIALS IN A DISTRIBUTED ENVIRONMENT

(71) Applicant: Oracle International Corporation, Redwood Shores, CA (US)

(72) Inventors: Harish Nandyala, Fremont, CA (US); Prasad V. Bagal, Saratoga, CA (US); Sameer Arun Joshi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 14/033,199

(22) Filed: Sep. 20, 2013

(65) Prior Publication Data
US 2015/0089608 A1   Mar. 26, 2015

(51) Int. Cl.
G06F 7/04 (2006.01)
H04L 29/06 (2006.01)
G06F 15/16 (2006.01)

(52) U.S. Cl.
CPC .............. H04L 63/08 (2013.01); H04L 63/20 (2013.01); G06F 15/16 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,875,296 A | * | 2/1999 | Shi | G06F 21/41 726/5 |
| 5,918,228 A | * | 6/1999 | Rich | G06F 21/41 |
| 5,999,978 A | * | 12/1999 | Angal | G06F 21/305 707/999.009 |
| 6,430,576 B1 | * | 8/2002 | Gates | G06F 17/30174 |
| 7,395,333 B1 | * | 7/2008 | Saulpaugh | H04L 63/0807 709/203 |
| 7,546,452 B2 | | 6/2009 | Aissi et al. | |
| 8,156,246 B2 | * | 4/2012 | Short | H04L 63/08 709/219 |

(Continued)

OTHER PUBLICATIONS

Sun Microsystems, Inc., "System Administration Guide: Solaris Containers-Resource Management and Solaris Zoness", Santa Clara, California, Jun. 2005, 342 pages.

(Continued)

*Primary Examiner* — Phy Anh T Vu

(74) *Attorney, Agent, or Firm* — Vista IP Law Group, LLP

(57) ABSTRACT

A multi-node cluster is configured for credential management. A method commences by retrieving a super-user credential from a credential record stored in a location accessible to the cluster, then propagating the super-user credential to a set of nodes in the multi-node cluster. A credential creating processes is invoked on at least some of the set of nodes. Application-level credential access can be implemented in a multi-cluster environment by carrying-out an exchange that passes credentials between a first cluster and a second cluster over a secure channel. A protocol is observed whereby one or more applications running on the first cluster receive new credentials for accessing the second cluster from the credential serving process after the credential creating process creates the new credential.

20 Claims, 7 Drawing Sheets

(56) References Cited

U.S. PATENT DOCUMENTS

| | | | |
|---|---|---|---|
| 8,392,587 B2* | 3/2013 | Wray | G06F 21/604 |
| | | | 705/28 |
| 2003/0187993 A1* | 10/2003 | Ribot | 709/227 |
| 2003/0236895 A1* | 12/2003 | Ohkubo | H04N 7/17318 |
| | | | 709/229 |
| 2004/0210582 A1* | 10/2004 | Chatterjee | G06F 17/30575 |
| 2005/0257211 A1* | 11/2005 | Chatterjee | G06F 8/67 |
| | | | 717/170 |
| 2006/0041650 A1* | 2/2006 | Luo | H04L 12/24 |
| | | | 709/223 |
| 2006/0294192 A1* | 12/2006 | Mao | H04L 67/306 |
| | | | 709/213 |
| 2007/0011452 A1 | 1/2007 | Marquet et al. | |
| 2008/0320574 A1* | 12/2008 | Childress | H04L 63/083 |
| | | | 726/7 |
| 2009/0327419 A1* | 12/2009 | Serr | H04L 61/1523 |
| | | | 709/204 |
| 2010/0037046 A1 | 2/2010 | Ferg et al. | |
| 2010/0251339 A1 | 9/2010 | McAlister et al. | |
| 2012/0151563 A1 | 6/2012 | Bolik et al. | |
| 2014/0057599 A1* | 2/2014 | Hazari | H04W 12/06 |
| | | | 455/411 |

OTHER PUBLICATIONS

Cisco, "Cisco Unified Wireless Guest Access Services", Enterprise Mobility 4.1 Design Guide, Sep. 7, 2011, 39 pages.

Lieberman Software Corporation, Microsoft, "System Center Operations Manager Extension for Enterprise Random Password Manager", Jul. 19, 2011, 1 page.

Lieberman Software Corporation, "Privileged Identity Management, an Executive Overview", Los Angeles, California, 2010, 12 pages.

Gredia, "Grid enabled access to rich media content", D1.1: Current Practices and State of the Art, Nov. 30, 2006, 112 pages.

Per-Olov Ostberg, et al., "Reducing Complexity in Management of eScience Computations", 12$^{th}$ IEEE/ACM International Symposium on Cluster, Cloud and Grid Computing, 2012, 8 pages.

* cited by examiner

AUTOMATIC CREATION AND MANAGEMENT OF CREDENTIALS IN A DISTRIBUTED ENVIRONMENT

FIELD

The disclosure relates to the field of distributed computing environments and more particularly to techniques for creating secure credentials spanning multiple secure computing environments.

BACKGROUND

Distributed computing environments are ubiquitous, and databases running within such distributed computing environments are also ubiquitous. While computing models have trended over time (e.g., from centralized computing to multi-processor computing, to networked computing, to clusters and to clouds, etc.), and while security and authorization concerns are trending to be ever more heightened day-by-day, the credentialing process has failed to keep up with these trends. Significant manual work is needed to create each credential, and at the same time, more and more credentials are needed to deal with the trending computing models and granularity of authorizations.

As an example, an enterprise system might be organized as one cluster running many applications as different users. The cluster might require user credentials (e.g., credentials for a user on the operating systems of the cluster) and also applications might require login identification (e.g., screen names and passwords). In another setting, an enterprise installation might be organized as having one client system (e.g., a cluster) serving hundreds of users that run many applications (e.g., accounts payable applications, human resources applications, etc.), and having another system (e.g., a database cluster) to serve hundreds of users (or more) and possibly thousands (or more) different types of separately authorized types of operations (e.g., database operations).

Unfortunately, the credentialing processes needed to authorize these thousands (or more) different types of separately authorized types of operations remains a time-consuming, high-latency, cumbersome and often almost entirely manual set of steps that need to be executed for each user in order to create and manage credentials (e.g., operating system credentials) before the user can fulfill his or her job functions.

Techniques are needed to reduce or eliminate the time-consuming, high-latency, cumbersome and often almost entirely manual set of steps needed to establish operating system credentials. Yet, the aforementioned trends only exacerbate the problems that now exist, namely, that deployment of systems atop current computing models such as in a distributed computing environment supporting many nodes and many operating system users results in a high demand for credential creation.

Some legacy approaches have attempted to partially address the high demand by implementing a mapping between operating system credentials and credentials of a corresponding user such that an application can look up credentials held by the operating system user that is logged into (and running) the application. However, this only partially addresses the high demand since the operating system credentials for a given user still have to be created manually. Worse, a given user might need access to certain operating system rights when running (for example) an accounts payable application, but might not need similar operating system rights when running (for example) a human resources application. In legacy models, each needed operating system credential demands manual intervention to initially create the operating system credential. None of the aforementioned legacy approaches achieve the capabilities of the herein-disclosed techniques for automatically creating secure operating system credentials spanning multiple secure computing environments. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for creating secure credentials spanning multiple secure computing environments.

A multi-node cluster is configured for credential management. A method commences by retrieving a super-user credential from a credential record stored in a location accessible to the cluster, then propagating the super-user credential to a set of nodes in the multi-node cluster. A credential creating processes is invoked on at least some of the set of nodes. Application-level credential access can be implemented in a multi-cluster environment by carrying-out an exchange that passes credentials between a first cluster and a second cluster over a secure channel. A protocol is observed whereby one or more applications running on the first cluster receive new credentials for accessing the second cluster from the credential serving process after the credential creating process creates the new credential.

In another embodiment, a multi-cluster system serves credentials between a first cluster (e.g. a client cluster) and a second cluster (e.g., a storage cluster). Each cluster comprises many computing nodes, and shares a single common super-user credential that is manually created and then propagated to each node in the cluster. Then, a protocol is observed whereby a process running on the first cluster (e.g., an application process) that does not initially have a credential for the second cluster receives a new credential for the second cluster from the credential serving process after the credential creating process creates the new credential. For security, the second cluster invokes an authentication process (e.g., using a challenge protocol service) before creating the new credential. The credential is passed to the first cluster over a secure channel between the first cluster and the second cluster, and the credential is then passed to the application.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1:
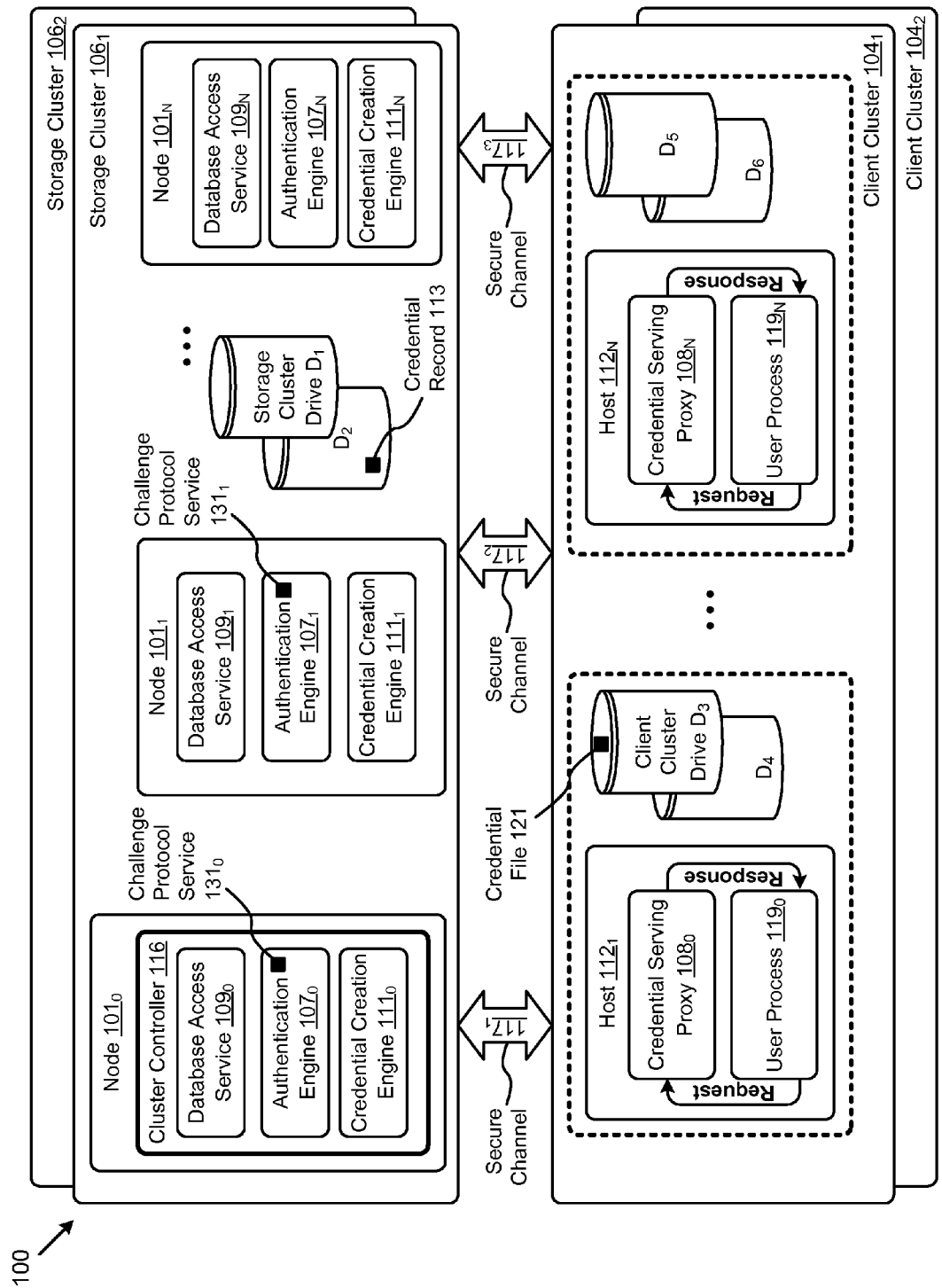
FIG. 1 is a diagram of a distributed computing architecture within which is shown processes and communications used for creating secure credentials spanning multiple secure computing environments, according to some embodiments.

Some embodiments of the present disclosure address the problem of high demand for credential creation in a distributed computing regime, and some embodiments are directed to improved approaches for creating secure credentials spanning multiple secure computing environments. More particularly, disclosed herein and in the accompanying figures are exemplary environments, methods, and systems for creating secure credentials spanning multiple secure computing environments.

Overview

Prior to the development of the techniques disclosed herein, the enforcement of rights and limitations or quotas granted to a particular requestor of a particular computer-implemented service was determined based on credentials residing on the same machine under which the requestor had "logged-in". For example, a requesting process might inherit the credentials of a "logged-in" user. Thus, access and control rights and limitations ascribed to a computer process can be imputed by the enforcement processes based on the credentials of the logged-in user. While this can serve limited intended purposes when the credentials are stored on the same machine (e.g., the machine into which the user is "logged-in") the advent of distributed environments brings complexities to the credentialing and enforcement regime. For example, in the situation of multiple secure computing environments, there needs to be some means to ascribe rights and limitations to a user or process on each of any number of machines in the secure computing environment.

In one embodiment of the systems disclosed herein, rather than manually creating a credential for each node in a cluster, just one single super user credential is created manually. The credentials of this one super user are then propagated to all the nodes in the cluster (e.g., the same single super-user credential is stored locally on each node of the cluster). A credential creating process having the single super-user credential runs on each node of the cluster. Additionally, an authentication engine runs on at least one node in the cluster. During operation, when there is a need for an application (e.g., a user processing running on an application cluster) to perform operations that require particular credentials, the local credential management proxy is contacted. This local proxy will validate that the user running the requesting process can be authenticated. If the local credential management proxy determines that the particular credentials needed by the requesting process/user were not then available, the proxy will contact the storage cluster over a secure channel to request a new credential.

When the identity of the requestor has been validated by the storage cluster (e.g., authenticated over the secure connection), the requested credentials will be created automatically and sent to the local credential management proxy, which in turn stores the newly-created credential locally for future use. The newly-created credentials can be used thenceforth by the requesting process whenever such particular credentials are needed.

Additional advancements and improved methods are disclosed hereunder. The improvements are non-intrusive to deployed computing environments. The improved methods can still use machine-by-machine (or cluster-by-cluster) storage of a secure and encrypted set of credentials, along with that machine's (or cluster's) own secrets, authentication procedures, and so on, while still relieving system administrators of the manual tasks involved in the creation of credentials each and every time there is a credential demand by a user or process for a particular right or limitation or quota.

In accordance with the herein-disclosed techniques, the workload demanded from administrators can be reduced significantly, down to a few simple operations that create root credentials which in turn are used to create a secure channel and which in turn are used to initially populate an operating system accessible credentials file (e.g., a password file) with those root credentials. The initially-seeded credentials file is used to facilitate secure authenticated logins to a target machine or cluster.

One embodiment stores a single super user credential that is created by a system administrator. The credentials of this single super user are stored at any/all of the computing machines (e.g., nodes) in a cluster (e.g., in a storage cluster), and such super user credentials are encrypted and stored for local access by each node in the cluster (e.g., in the storage cluster). A credential management entity runs on each node in the cluster (e.g., see credential creation engine of FIG. 1), and the credential management entity engages in a secure protocol with any one or more credential serving entities (e.g., see credential serving proxy of FIG. 1). When there is a need to authenticate a user or a need to authenticate the user's process, or a need to authenticate the user's process requests (e.g., a need to fetch the credentials and rights and limitation for a particular user), the local credential management entity is contacted. This local credential management entity will attempt to validate that the requesting process is indeed running as the specified and authenticated user. Once the authentication is complete, the credential management entity will contact a credential serving entity with a request to create the credentials for the requesting user. The security of the channel is accomplished through means of the credentials of the super user (e.g., the super user's credentials include secrets and/or keys as used in authentication and encryption). However, if a request to retrieve the credentials for the requesting user was denied (e.g., in the case that a credential was not present in the authentication file), then new credentials for the requesting user are created automatically (e.g., using a credential creating process) and the new credentials are sent over the secure channel for delivery to the requesting process. Persistent storage of the new credential is facilitated by a process running on the same machine (or cluster) as is running the application of the requesting user. Subsequent requests by the application for operations at the storage cluster can be accompanied by a copy or representation of the newly-created credential, and accordingly privileged operations to be performed by the storage cluster can perform the privileged operations based on the proffered credential.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1 is a diagram of a distributed computing architecture 100 within which is shown processes and communications used for creating secure credentials spanning multiple secure computing environments. As an option, the present distributed computing architecture 100 or any aspect thereof may be implemented in the context of the architecture and functionality of the embodiments described herein. Also, the distributed computing architecture 100 or any aspect thereof may be implemented in any desired environment.

As shown, one or more storage clusters 106 (e.g., storage cluster $106_1$, storage cluster $106_2$, etc.) are in communication with one or more client clusters (e.g., client cluster $104_1$, client cluster $104_2$, etc.) over one or more secure channels (e.g., secure channel $117_1$, secure channel $117_2$, secure channel $117_3$, etc.). A storage cluster comprises any number of nodes (e.g., node $101_0$, node $101_1$, node $101_N$, etc.), which in turn comprise respective instances of a database access service (e.g., database access service $109_0$, database access service $109_1$, database access service $109_N$, etc.), respective instances of an authentication engine (e.g., authentication engine $107_0$, authentication engine $107_1$, authentication engine $107_N$, etc.), and respective instances of a credential creation engine (e.g., credential creation engine $111_0$, credential creation engine $111_1$, credential creation engine $111_N$, etc.). Any node or nodes (e.g., node $101_0$, node $101_1$, node $101_N$, etc.) can access instances of cluster storage (e.g., storage cluster drive $D_1$, storage cluster drive $D_2$, etc.).

In some settings, a set of nodes comprising a storage cluster are configured so as to be under the supervision of a cluster controller 116. The supervisory functions of such a cluster controller can be mapped onto any node of the cluster, and a cluster controller can perform any of the services of any other node. In particular, some cluster controllers are configured to facilitate periodic authentication using a challenge protocol service (e.g., challenge protocol service $131_0$). A challenge protocol service can be implemented on any node of the cluster (e.g., challenge protocol service $131_1$).

The shown client clusters 104 comprise hosts 112 (e.g., host $112_1$, host $112_N$, etc.), which in turn comprise respective instances of a credential serving proxy (e.g., credential serving proxy $108_0$, credential serving proxy $108_N$, etc.) and respective instances of a user process (e.g., user process $119_0$, user process $119_N$, etc.). A user process can access node-local client cluster storage (e.g., client cluster drive $D_3$, client cluster drive $D_4$, client cluster drive $D_5$, client cluster drive $D_6$, etc.). Any node-local client cluster storage can persistently store a credential file 121.

The distributed computing architecture 100 can be configured as a system for creating secure credentials spanning multiple secure computing environments. Strictly as one example, a storage cluster drive persistently stores a single super user credential (e.g., as a credential record 113 in a record-oriented credential file) that is created by a system administrator. The credentials of this single super user can be stored at any/all of the computing machines (e.g., nodes) in the storage cluster, and such super user credentials can be encrypted and stored and/or cached for access by any node in the cluster.

A credential management entity (e.g., comprising an authentication engine and a credential creation engine, as shown) runs on each node in the cluster (e.g., see instances of credential creation engines), and the credential management entity engages in a secure protocol with any one or more credential serving entities (e.g., see instances of credential serving proxies 108). When there is a need to authenticate the identity of a user, or a need to authenticate the user's process, or a need to authenticate the user's process requests (e.g., a need to fetch the credentials and rights and limitation for a particular user), the local credential management entity is contacted. This local credential management entity will attempt to validate that the requesting process is indeed running as the specified and authenticated user (e.g., see authentication engines 107).

Once the authentication is complete, the credential management entity will contact a credential serving entity running elsewhere (e.g., elsewhere in the cluster or elsewhere on a different cluster accessible over a secure channel) with a request to create the credentials for the (now authenticated) requesting user. The security of the channel is accomplished through means of the credentials of the super user (e.g., the super user's credentials include secrets and/or keys as used in authentication and encryption). However, in the case that a credential was not present in the credential file 121, then a new credential for the requesting user are created automatically. Once created, the new credential can be provided to a requesting process. Persistent storage of the new credential is facilitated by a process running on the same machine (or cluster) as is running the application of the requesting user. The request to retrieve the credentials for the requesting user can be served by any one (or more) of credential serving proxies 108 as may be instanced on the client cluster.

The foregoing discusses but one possible sequence and assignment of operations. Other sequences and assignment of operations are reasonable and envisioned, some of which are presently discussed.

In one embodiment, a cluster controller maintains a cluster-wide repository in the form of a shared data storage area that is READ-ONLY accessible to any user. However, READ-WRITE control for this data is restricted based on privileges granted to the user by the operating system's authentication and permissions regime. This cluster wide repository can be used for storing application-specific credentials. The application-specific credentials for each OS user are accessible only by that OS user. As one implementation aspect of this embodiment, access and control can be implemented using two threads of control:

A first thread provides a service to access the cluster wide repository.

A second thread provides a service to create application-specific credentials when requested.

When an application needs its credentials, it can initiate processing activities by invoking an application programming interface (API). One possible implementation of such an API includes contacting the first thread to lookup the credentials of the executing OS user. Access to lookup the credentials is controlled by OS user verification. Once it is verified, the first thread looks up the credentials. If the needed credentials are not present, the first thread will inform the application about the lack of credentials. The application will then invoke another API. The implementation of this second API includes contacting the second thread. The second thread will again verify that the initiator is indeed running as the requested OS user. Once this verification is complete, it will contact the credential server with the credentials of the super user. The credential serving entity will then create credentials for the requested OS user. These credentials are stored in the cluster wide repository, and control will return to the application. The application can now again initiate a lookup, however in this case the credentials would have been created, so the lookup would be successful.

Figure 2:
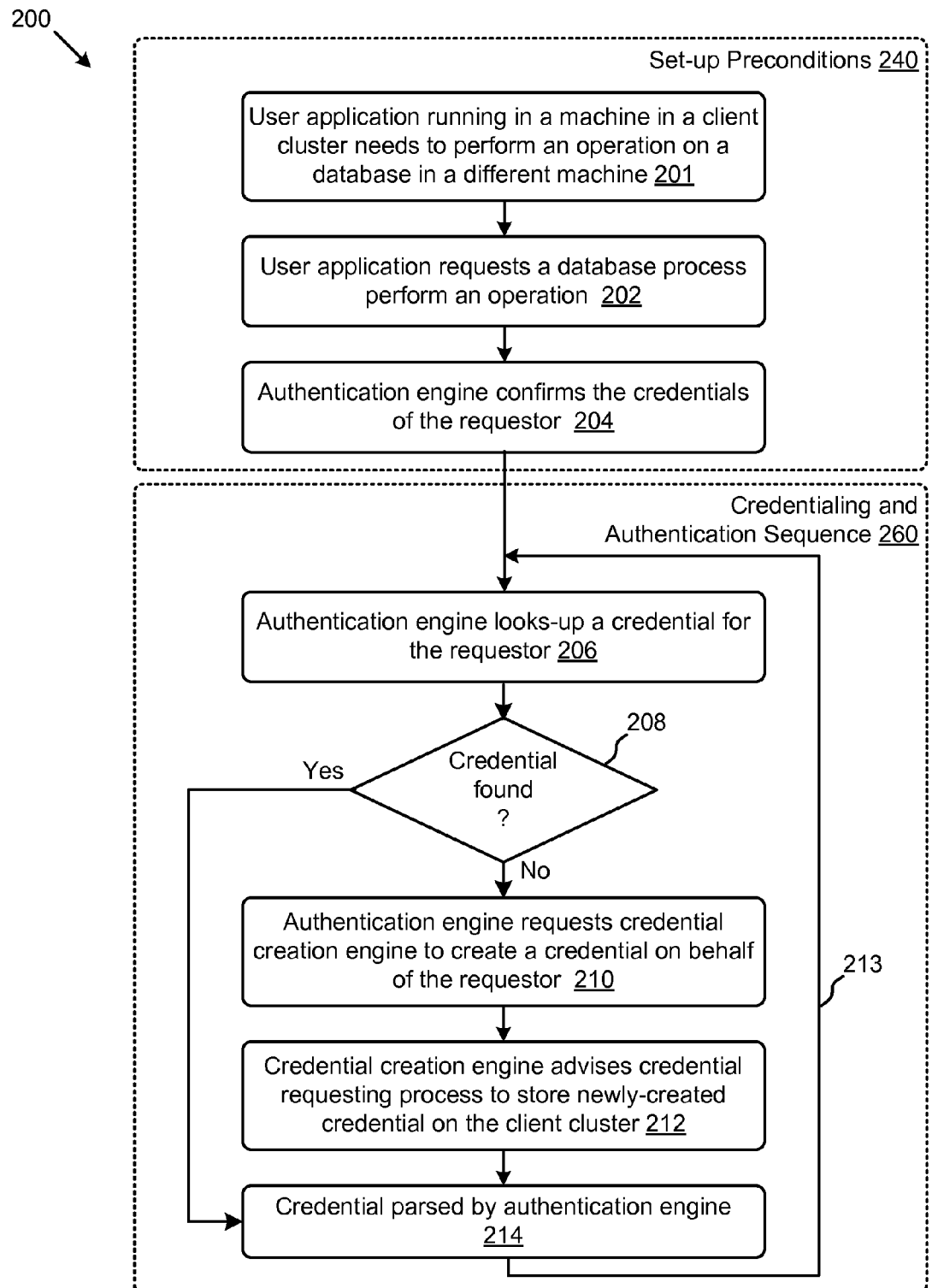
FIG. 2 shows setup and processing portions of an operation flow used when creating secure credentials spanning multiple secure computing environments, according to some embodiments.

FIG. 2 shows setup and processing portions of an operation flow 200 used when creating secure credentials spanning multiple secure computing environments. As an option, the present operation flow 200 or any aspect thereof may be implemented in the context of the architecture and functionality of the embodiments described herein. Also, the operation flow 200 or any aspect thereof may be implemented in any desired environment.

As shown, the operation flow 200 is depicted in two stages:

A stage describing set-up preconditions 240, and

A stage describing a credentialing and authentication sequence 260.

The set-up preconditions characterize the situation when a user application (e.g., a user process $119_0$ or user process $119_N$) running in or on a machine (e.g., host $112_1$, host $112_N$) in a client cluster needs to perform an operation pertaining to a database on a different machine, such as on a node within a storage cluster (see operation 201). The machine can be a physical machine such as a CPU, or can be a virtual machine or hypervisor.

During the execution of the user application, the user application makes a request to a database process (see operation 202) to perform an operation on the database. The database process might be configured to observe a security policy. Such a policy might include requirements that the database process check the credentials of the requestor to confirm that the requestor is indeed the entity as being held out. Such a policy might require that the requestor has a login credential on the same machine that the database process is running on, and such a policy might require that the requestor have an encryption key and/or secrets. As indicated in the foregoing, an authentication engine needs to confirm the credentials of the requestor—at least so as to confirm the identity of the requestor (see operation 204). At this point the set-up preconditions 240 have been met, and the credentialing and authentication sequence 260 is entered.

At step 206 of the credentialing and authentication sequence, the authentication requesting engine looks up a credential for the requestor. If the requestor does have a login credential on the same machine that the database process is running on, then the identity of the requestor can be immediately verified, and processing continues at step 214 where the found credential is parsed by the authentication engine. If the requestor does not have a login credential on the same machine that the database process is running on, then the identity of the requestor cannot be immediately verified and additional steps are taken.

For example, and as shown, if the requestor does not have a login credential on the same machine that the database process is running on (see decision 208), then processing moves to step 210. The authentication engine requests a credential creation engine to create a credential on behalf of the requestor (see step 210). In exemplary embodiments, the local credential management process includes an authentication engine and/or a credential creation engine or other process that has super user privileges. Such super user privileges enable the credential creation engine to:

Authenticate the requestor by communicating over a secure channel (e.g., using super user credentials), Create a new credential on behalf of the requestor, and store it (e.g., as a credential record 113), Advise the requesting process (e.g., the super user proxy) of the details of the newly-created credential, and Advise the requesting process (e.g., the super user proxy) to store the newly-created credential on its own machine (e.g., on the client cluster).

At the conclusion of step 212 the newly-created credential is stored for local access by a credential management process, and the newly-created credential is also stored for local access by a super user proxy. As such, subsequent attempts (e.g., the look-up attempt of step 206 after loopback 213) to authenticate and authorize a user process can be performed locally without re-incurring inter-machine communication overhead. Furthermore, the next time that a user process needs to execute an operation on the database cluster, the user process can provide a credential that can be used by the credential management processes running on the database cluster.

The aforementioned steps, partitions, and use of proxies are purely illustrative, and other steps, partitions, and use of proxies are reasonable and possible, some of which are presently discussed.

Figure 3:
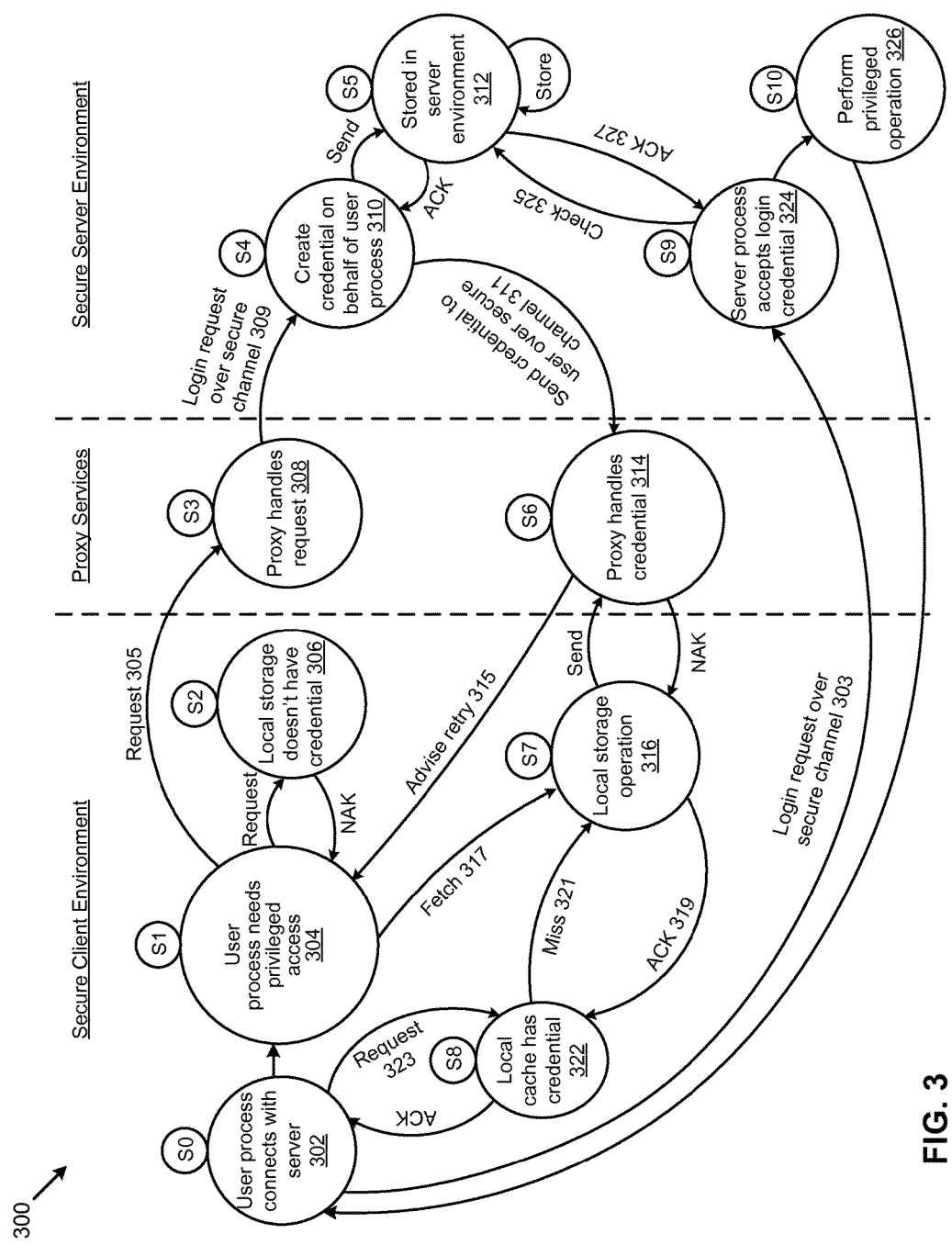
FIG. 3 is a state diagram of a proxy-based implementation of a system for creating secure credentials spanning multiple secure computing environments, according to some embodiments.

FIG. 3 is a state diagram of a proxy-based implementation 300 of a system for creating secure credentials spanning multiple secure computing environments. As an option, the present proxy-based implementation 300 or any aspect thereof may be implemented in the context of the architecture and functionality of the embodiments described herein. Also, the proxy-based implementation 300 or any aspect thereof may be implemented in any desired environment.

The embodiments corresponding to the foregoing figures are merely illustrative, and other architectures and sequence are reasonable and envisioned in order to creating secure credentials spanning multiple secure computing environments. The state diagram of FIG. 3 can be traversed through various states based on dynamically-detected events. The state diagram of proxy-based implementation supports many variations of systems for creating secure credentials spanning multiple secure computing environments.

As shown, a proxy-based implementation 300 operates in an environment spanning multiple secure computing environments. In this embodiment, the secure client environment includes a user process that connects with a server process (see state 302) within a secure server environment. In steady-state cases, the user process has a credential suitable for login and/or other operations in the secure server environment, and the user process makes a request to login to the secure server environment (see event 303). In such a case, the server checks the supplied credential (see check 325) and upon receipt of the ACK 327, accepts the login credential. In some cases the supplied credential includes sufficient detail to server not only as an authentication credential, but also as a privilege matrix that specifies allow/deny flags for particular operations (see state 324). As such, an operation requested by the authenticated user can be performed (see state 326), and the results of such an operation can be returned to the requesting process (e.g., over a secure channel).

In another situation, namely before the user process has a credential for the secure server, the user process might need privileged access (see state 304) in order for services provided within the secure server environment to be performed with the proper credentials. Accordingly, a request is made to a local credential storage in an attempt to retrieve a credential for the server environment. In such a situation, the local storage doesn't have such a credential (see state 306), and the request receives a negative acknowledgement. In such an event, the user process still needs privileged access, thus the user process submits a request (see event 305) to a proxy to handle the request (see state 308). The shown proxy receives the request and handles the request by submitting a login request to the server using a secure channel (see event 309). The proxy is given super user privileges upon initial launch, and there can be one proxy per cluster to support any number of user processes.

On the secure server side, the aforementioned login request to the server is processed, and the request might also contain a request to create a server-side credential on behalf of the user process (see state 310). The created credential is stored locally on the server side (see state 312). Now, having created the server-side credential on behalf of the user process, the credential is also sent to the secure client environment (see event 311). In this embodiment, the proxy handles the newly-created credential (see state 314) and stores the newly-created credential in a location local to the user processes in the secure client environment (see operation 316). The proxy sends advice to retry (see event 315), resulting in a fetch 317 and a positive acknowledgement 319. In some cases, a cache might be employed. As such, a fetch operation (see operation 323) might retrieve a credential from local cache (see state 322), or a miss might be processed (see miss event 321) before retrieving a credential from local cache. In the aforementioned cases, the needed credential is retrieved, and processing can continue such that a login request (see event 303) can be granted by the secure server environment.

Figure 4:
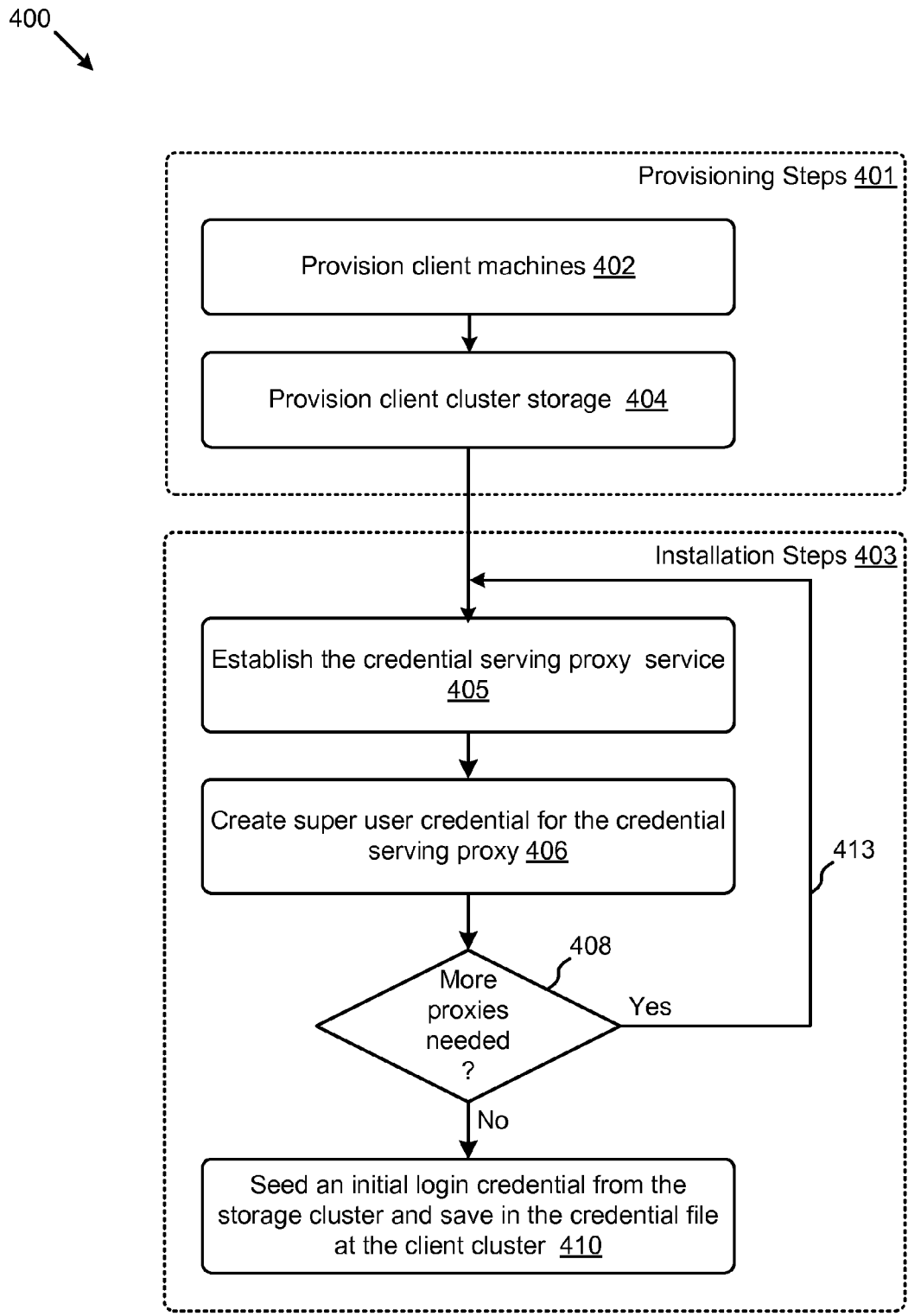
FIG. 4 is a diagram showing provisioning and installation steps performed when configuring system components for creating secure credentials spanning multiple secure computing environments, according to some embodiments.

FIG. 4 is a diagram showing provisioning and installation steps 400 performed when configuring system components for creating secure credentials spanning multiple secure computing environments. As an option, the present provisioning and installation steps 400 or any aspect thereof may be implemented in the context of the architecture and functionality of the embodiments described herein. Also, the provisioning and installation steps 400 or any aspect thereof may be implemented in any desired environment.

The provisioning and installation steps discussed below are purely illustrative. Other provisioning and installation procedures are envisioned. The specific embodiment of FIG. 4 supports the architectures heretofore described.

As shown, the provisioning steps 401 comprise provisioning client machines (see step 402). This provisioning can entail providing a "cluster instance" or "bootable image" that is replicated or instanced onto a plurality of hosts within the client cluster. In some cases, the instance itself provides for host-specific local storage. In other situations a given host can access cluster-wide storage. In still other cases one or more hosts can be configured to access a first storage area, and a second set of hosts can be configured to access a second storage area. In such cases, the provisioning steps include provisioning hosts with access to client cluster storage (see step 404).

As is depicted in FIG. 1, a host within a client cluster can comprise any number of credential serving proxies 108. Such proxies can be included in the "cluster instance" or "bootable image", and/or can be configured one-by-one or in subgroups. The shown installation steps 403 include an operation to establish a credential serving proxy service (see step 405), and the shown installation steps include an operation to create a super user credential for the credential serving proxy (see step 406). If additional proxies are needed (see decision 408) then path 413 is taken to establish start-up of another credential serving proxy service (see step 405).

In exemplary cases, the aforementioned installation steps also comprise configuring the credential serving proxies 108 to hold the location and other access formation pertaining to the credential file 121. The steps to establish the start-up of the proxies and ascribing super user attributes to the proxy can be repeated for as many proxies as are needed.

Even though the previous steps may configure many proxies on the client cluster, only one login credential (see step 410) need be created in the storage cluster (e.g., a login credential of the super user). As can now be appreciated, the foregoing disclosure and the use of a super user proxy serves to greatly reduce the workload related to creating secure credentials spanning multiple secure computing environments.

After accomplishing the foregoing provisioning and installation steps, then during steady-state operation of a client cluster in cooperation with a storage cluster, there are no manual operations that need to be performed. Once the super user credentials are seeded (see step 410) and propagated as needed by the specific architecture of the storage cluster, the needed credentials for the client cluster users are managed automatically.

ADDITIONAL EMBODIMENTS OF THE DISCLOSURE

Additional Practical Applications

Figure 5:
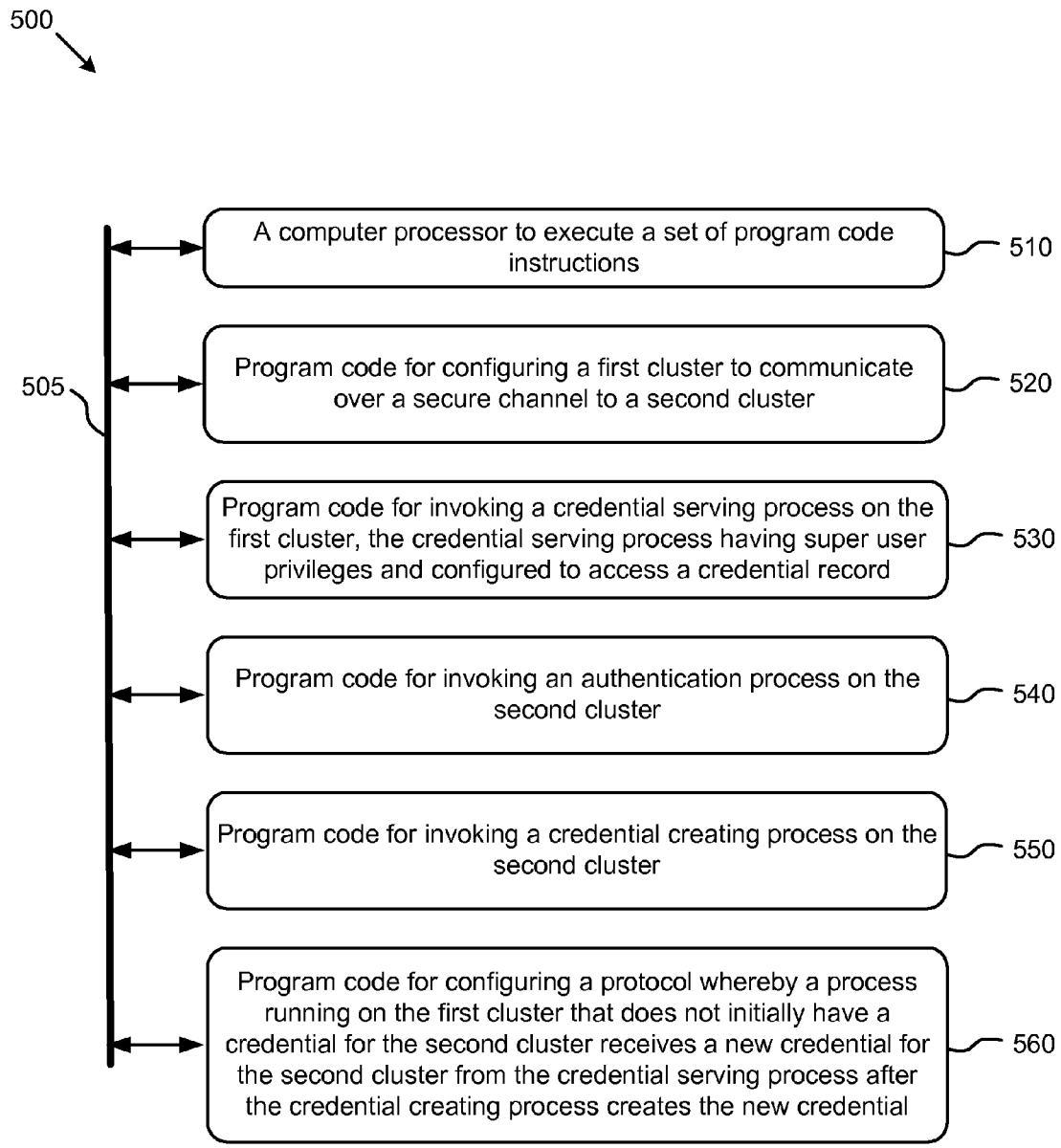
FIG. 5 is a block diagram of a system for creating secure credentials spanning multiple secure computing environments, according to some embodiments.

FIG. 5 is a block diagram of a system 500 for creating secure credentials spanning multiple secure computing environments. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: configuring a first cluster such as a client cluster to communicate over a secure channel to a second cluster such as a storage cluster (see module 520); invoking a credential serving process on the first cluster, the credential serving process having super user privileges for the first cluster, and configured to access a credential file that is stored on or accessible to the first cluster (see module 530); invoking an authentication process on the second cluster (see module 540); invoking a credential creating process on the second cluster (see module 550); and configuring a protocol whereby a process running on the first cluster that does not initially have a credential for the second cluster receives a new credential for the second cluster from the credential serving process after the credential creating process creates the new credential (see module 560).

Figure 6:
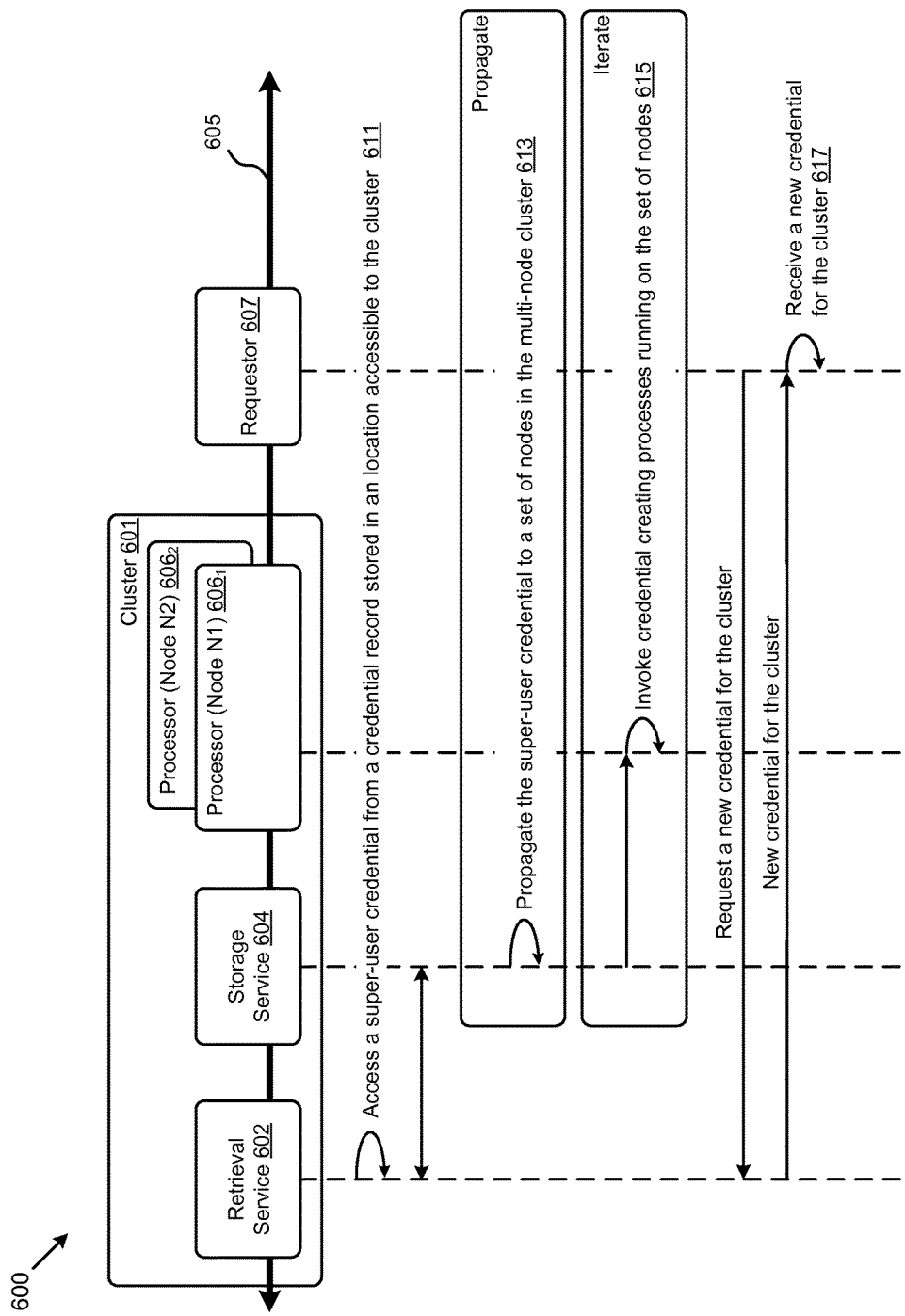
FIG. 6 is a block diagram of a system for creating secure credentials spanning multiple secure computing environments, according to some embodiments.

FIG. 6 is a block diagram 600 of a system for creating secure credentials spanning multiple secure computing environments. As shown, the system components interact over path 605. Interaction includes interoperation between components to implement credential management in a multi-node cluster 601 comprising multiple processor nodes (e.g., Node N1 606$_1$, Node N2 606$_2$). As shown, the components include:
- A retrieval service 602 for retrieving a super-user credential from a credential record stored in a location accessible to the cluster (see operation 611);
- A storage service 604 (e.g., a command line service, a script, a daemon, etc.) for propagating the super-user credential to a set of nodes in the multi-node cluster (see operation 613); and
- A processor (e.g., Node N1 606$_1$, Node N2 606$_2$) for invoking credential creating processes running on the set of nodes (see operation 615).

A retrieval service can further process a message from a requestor 606 to return a new credential, after which the requestor receives the new credential for the cluster 617 for storage and further use.

SYSTEM ARCHITECTURE OVERVIEW

Additional Practical Applications

Figure 7:
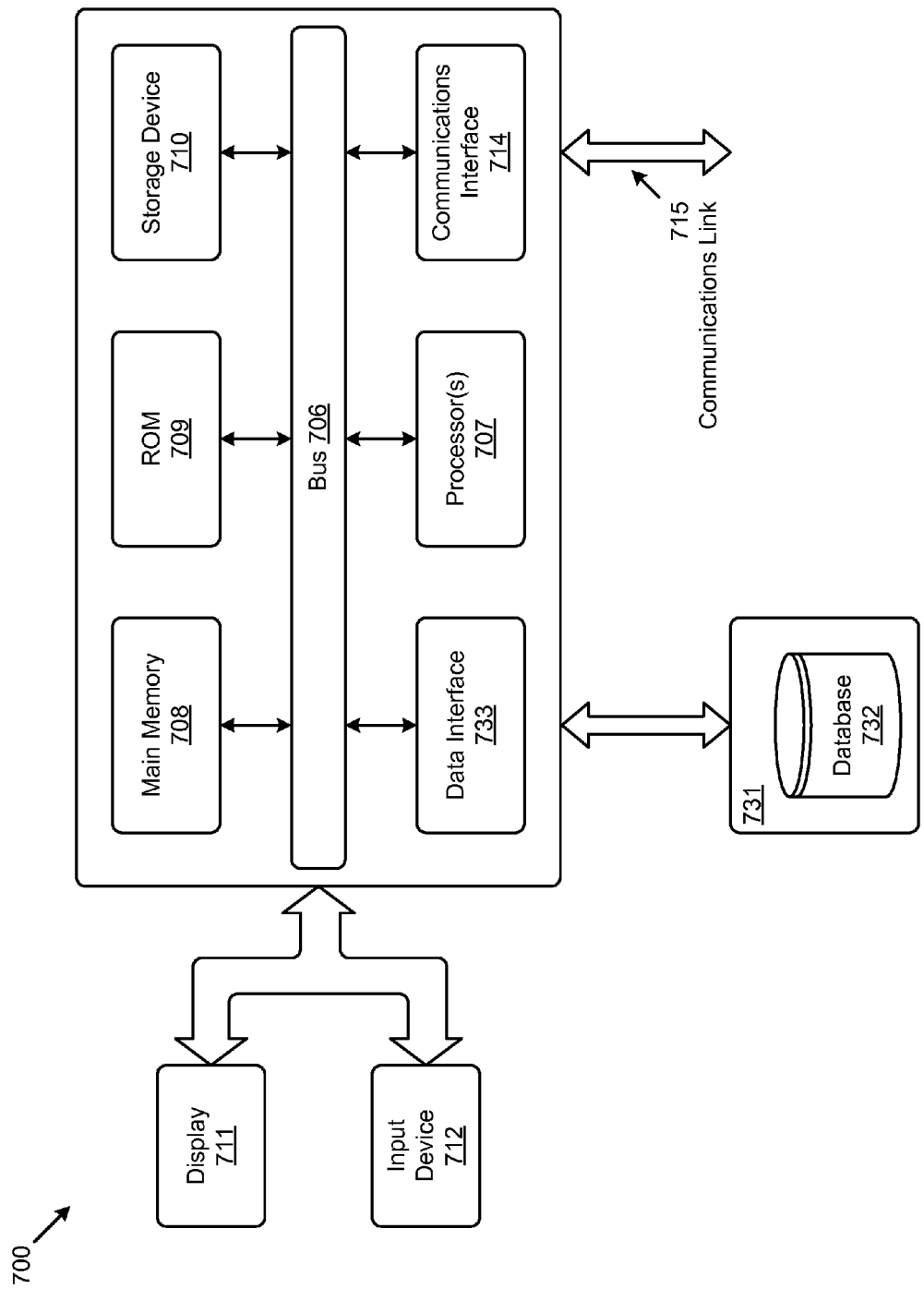
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for credential management in a multi-node cluster, the method comprising:

distributing a super-user credential providing root privileges of a super-user to a plurality of nodes in a client computing environment;
storing the super-user credential on the plurality of nodes, wherein the super-user credential is encrypted and authorizes the plurality of nodes to create application credentials that authorize access requests for a plurality of users on the plurality of nodes to access remote computing resources located on a remote node, and wherein the remote node is located in a server computing environment that is connected to the client computing environment via one or more network components;
authenticating an identity of a user on at least one node of the plurality of nodes by using at least a login credential received from the user on the at least one node;
validating whether an access request from the user is authorized for the user on the at least one node to access a remote computing resource located on the remote node;
in response to a successful validation of the access request, determining whether an application credential exists for authorizing the access request for the user on the at least one node of the plurality of nodes to access the remote computing resource located on the remote node; and
when the application credential for authorizing the access request for the user is determined not to exist to authorize the access request for the user, authorizing the user to access the remote resource at least by:
generating, by a proxy located on the at least one node, a credential creation request for the user by using at least the super-user credential;
authenticating, on the remote node, the credential creation request;
creating, at a credential serving entity on the remote node that functions in tandem with at least one microprocessor of the remote node, the application credential that is exclusively accessible by the user of the plurality of users on the plurality of nodes to access the remote computing resource in response to the credential creation request by using at least the super-user credential for the user to fulfill the access request;
establishing a secure connection between the at least one node and the credential serving entity on the remote node by using at least the super-user credential, the secure connection being established to transmit the application credential from the credential serving entity on the remote node to the at least one node via the secure connection;
storing the application credential which is exclusively accessible by the user, locally at the at least one node and on a central repository, wherein the central repository is accessible by the plurality of nodes; and
authorizing the access request with at least the application credential, which is exclusively accessible by the user, to allow the user to access the remote computing resource.

2. The method of claim 1, further comprising:
identifying the secure connection established by the proxy that is located on the at least one node to the credential serving entity on the remote node;
authenticating, at the remote node, the proxy by using the super-user credential distributed to the at least one node;
authorizing, at the remote node, the credential creation request generated by the proxy; and
receiving, at the credential serving entity, the credential creation request from the proxy via the secure connection.

3. The method of claim 2, wherein the authenticating the proxy further uses a challenge protocol service.

4. The method of claim 1, wherein the authenticating the identity of the user comprising:
contacting the credential serving entity on behalf of the user by using the super-user credential that authorizes a thread of execution to communicate with the credential serving entity on the remote node.

5. The method of claim 4, further comprising:
populating the super-user credential into an operating system accessible credentials file by using at least the root privileges of the super-user, the root privileges authorizing an access to the operating system accessible credentials file;
requesting, by an authentication engine on the at least one node, a credential creation engine on the at least one node to create the application credential for the access request to access the remote computing resource for the user, wherein both the authentication engine and the credential creation engine have the root privileges provided by the super-user credential;
authenticating, at the credential creation engine, the user of the access request by using the super-user credential; and
contacting, by the credential creation engine, the credential serving entity to create the application credential for the user by using the super-user credential.

6. The method of claim 5, further comprising:
upon determining that a process does not initially have a credential for the multi-node cluster, receiving a new credential for the multi-node cluster after the credential serving entity creates the new credential;
configuring a secure channel such that the secure channel includes at least one first connection point at the multi-node cluster and at least one second connection point at the process that does not initially have the credential for the multi-node cluster; and
communicating the new credential over the secure channel.

7. The method of claim 5, wherein the multi-node cluster is a storage cluster.

8. The method of claim 5, wherein the process that does not initially have a credential for the multi-node cluster is running in a client computing environment.

9. The method of claim 8, further comprising storing the new credential in a credential file accessible to the client computing environment.

10. A computer program product embodied in a non-transitory computer readable medium, the computer readable medium having stored thereon a sequence of instructions which, when executed by a processor causes the processor to execute a set of acts for credential management in a multi-node cluster, the set of acts comprising:
distributing a super-user credential providing root privileges of a super-user to a plurality of nodes in a client computing environment;
storing the super-user credential, wherein the super-user credential is encrypted and authorizes the plurality of nodes to create application credentials that authorize access requests for a plurality of users on the plurality of nodes to access remote computing resources located on a remote node, and the remote node is located in a server computing environment that is connected to the client computing environment via one or more network components;

authenticating an identity of a user on at least one node of the plurality of nodes by using at least a login credential received from the user on the at least one node;

validating whether an access request from the user is authorized for the user on the at least one node to access a remote computing resource located on the remote node;

in response to a successful validation of the access request, determining whether an application credential exists for authorizing the access request for the user on the at least one node of the plurality of nodes to access the remote computing resource located on the remote node; and when the application credential for authorizing the access request for the user is determined not to exist to authorize the access request for the user, authorizing the user to access the remote resource at least by:

generating, by a proxy located on the at least one node, a credential creation request for the user by using at least the super-user credential;

authenticating, on the remote node, the credential creation request;

creating, at a credential serving entity that functions in tandem with at least one microprocessor of the remote node, the application credential that is exclusively accessible by the user of the plurality of users on the plurality of nodes to access the remote computing resource in response to the credential creation request by using at least the super-user credential for the user to fulfill the access request;

establishing a secure connection between the at least one node and the credential serving entity on the remote node by using at least the super-user credential, the secure connection being established to transmit the application credential from the credential serving entity on the remote node to the at least one node via the secure connection;

storing the application credential, which is exclusively accessible by the user, locally at the at least one node and on a central repository, wherein the central repository is accessible by the plurality of nodes; and authorizing the access request with at least the application credential, which is exclusively accessible by the user, to allow the user to access the remote resource.

11. The computer program product of claim 10, wherein the sequence of instructions, when executed by the processor, causes the processor to execute the set of acts, the set of acts further comprising invoking an authentication process on at least one node of the multi-node cluster.

12. The computer program product of claim 11, wherein the authentication process includes a challenge protocol service.

13. The computer program product of claim 10, wherein the sequence of instructions, when executed by the processor, causes the processor to execute the set of acts, the set of acts further comprising:

upon determining that a process does not initially have a credential for a multi-node cluster, receiving a new credential for the multi-node cluster after the credential serving entity creates the new credential.

14. The computer program product of claim 13, wherein the sequence of instructions, when executed by the processor, causes the processor to execute the set of acts, the set of acts further comprising configuring a secure channel such that the secure channel includes at least one first connection point at the multi-node cluster and at least one second connection point at the process that does not initially have a credential for the multi-node cluster.

15. The computer program product of claim 14, wherein the sequence of instructions, when executed by the processor, causes the processor to execute the set of acts, the set of acts further comprising communicating the new credential over the secure channel.

16. The computer program product of claim 14, wherein the multi-node cluster is a storage cluster.

17. The computer program product of claim 14, wherein the process that does not initially have a credential for the multi-node cluster is running in a client computing environment.

18. The computer program product of claim 17, wherein the sequence of instructions, when executed by the processor, causes the processor to execute the set of acts, the set of acts further comprising storing the new credential in a credential file accessible by the client computing environment.

19. A system for credential management in a multi-node cluster, the system comprising:

a non-transitory computer accessible storage medium storing thereupon computer code;

at least one hardware processor to execute the computer code to distribute a super-user credential providing root privileges of a super-user to a plurality of nodes;

the at least one hardware processor configured to execute the computer code to store the super-user credential, wherein the super-user credential is encrypted and authorizes the plurality of nodes to create application credentials that authorize access requests for a plurality of users on the plurality of nodes to access remote computing resources located on a remote node, and the remote node is located in a server computing environment that is connected to the client computing environment via one or more network components;

the at least one hardware processor configured to execute the computer code to authenticate an identity of a user on at least one node of the plurality of nodes by using at least a login credential received from the user on the at least one node;

the at least one hardware processor configured to execute the computer code to validate whether an access request from the user is authorized for the user on the at least one node to access a remote computing resource located on the remote node;

in response to a successful validation of the access request, the at least one hardware processor configured to execute the computer code that determines whether an application credential exists for authorizing the access request for the user on the at least one node of the plurality of nodes to access the remote computing resource located on the remote node; and when the application credential for authorizing the access request for the user is determined not to exist to authorize the access request for the user, authorizing the user to access the remote resource at least by:

the at least one hardware processor configured to execute the computer code that generates, by a proxy located on the at least one node, a credential creation request for the user by using at least the super-user credential;

the at least one hardware processor configured to execute the computer code that authenticates, on the remote node, the credential creation request;

the at least one hardware processor configured to execute the computer code that creates, at a credential serving entity on the remote node that functions in tandem with at least one microprocessor of a remote node, the application credential that is exclusively accessible by the user of the plurality of users on the plurality of nodes to access the remote computing resource in response to the credential creation request by using at least the super-user credential to fulfill the access request;

the at least one hardware processor configured to execute the computer code that establishes a secure connection between the at least one node and the credential serving entity on the remote node by using at least the super-user credential, the secure connection being established to transmit the application credential from the credential serving entity on the remote node to the at least one node via the secure connection;

the at least one hardware processor configured to execute the computer code to store the application credential, which is exclusively accessible by the user, locally at the at least one node and on a central repository, wherein the central repository is accessible by the plurality of nodes; and the at least one hardware processor configured to execute the computer code that authorizes the access request with at least the application credential, which is exclusively accessible by the user, to allow the user to access the remote computing resource.

20. The system of claim 19, further comprising a protocol processor to execute the computer code to, upon determining that a process does not initially have a credential for the multi-node cluster, receive a new credential for the cluster after the credential serving entity creates the new credential.

* * * * *

UNITED STATES PATENT AND TRADEMARK OFFICE
CERTIFICATE OF CORRECTION

PATENT NO. : 10,237,252 B2  
APPLICATION NO. : 14/033199  
DATED : March 19, 2019  
INVENTOR(S) : Nandyala et al.

Page 1 of 1

It is certified that error appears in the above-identified patent and that said Letters Patent is hereby corrected as shown below:

In the Specification

In Column 3, Line 48, after "environment." insert -- In legacy regimes, there is a one-to-one correspondence between a machine (e.g., a node of a cluster) and a user credential. However, as the number of machines and nodes involved in a secure computing environment increases, this places an undue burden on system administrators to manually create a credential for each node. --, as a Continuation of the same Paragraph.

In the Claims

In Column 13, Line 53, in Claim 1, after "credential" insert -- , --.

In Column 14, Line 56, in Claim 10, after "processor" insert -- , --.

Signed and Sealed this  
Twenty-fifth Day of February, 2020

Andrei Iancu  
*Director of the United States Patent and Trademark Office*